F. L. SATTLEY & F. N. ROSENSTENGEL.
MACHINE FOR FORMING PAPER PACKAGES OR CARTONS.
APPLICATION FILED DEC. 22, 1913.
1,195,741.
Patented Aug. 22, 1916.
9 SHEETS—SHEET 1.
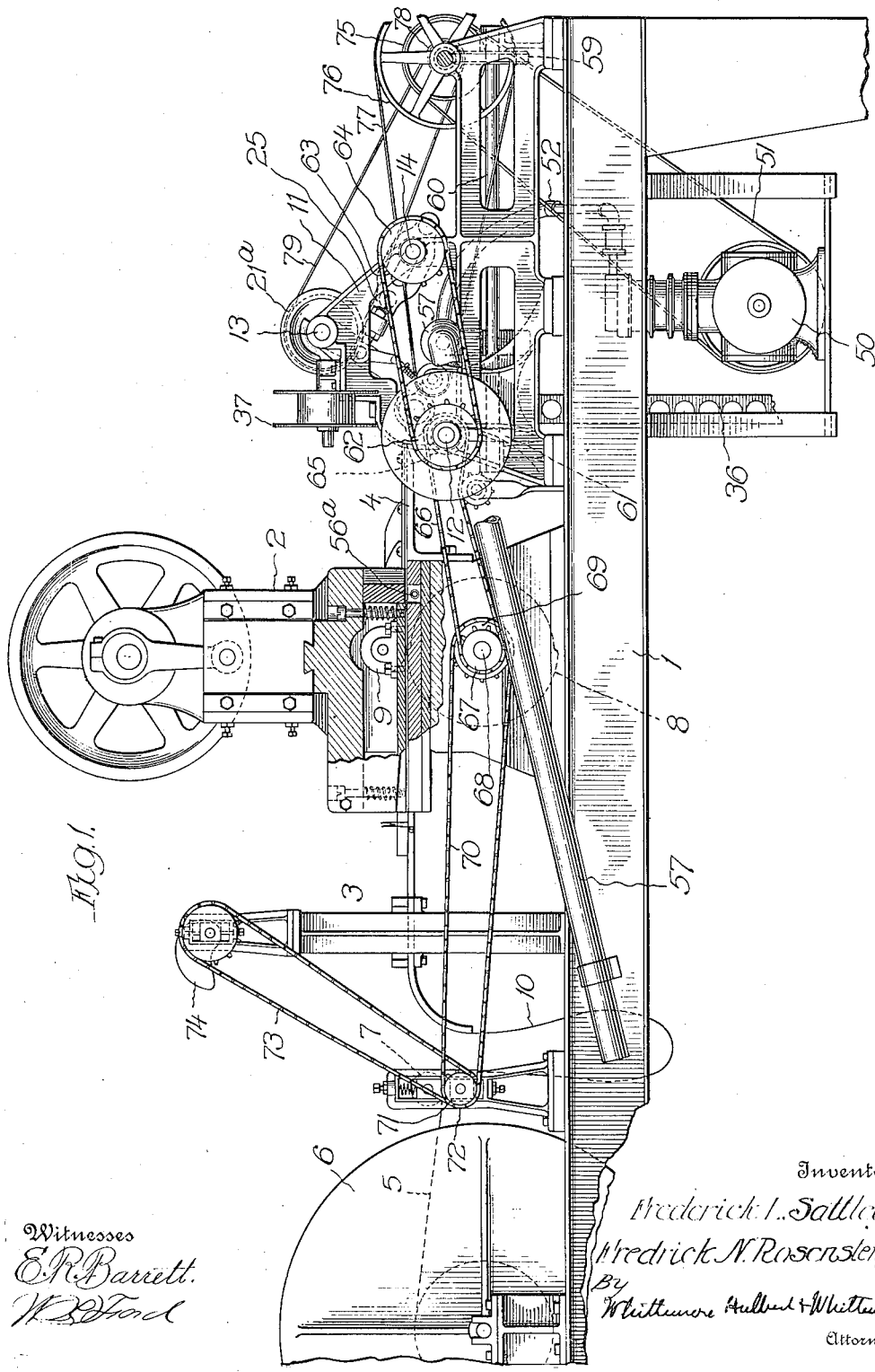

F. L. SATTLEY & F. N. ROSENSTENGEL.
MACHINE FOR FORMING PAPER PACKAGES OR CARTONS.
APPLICATION FILED DEC. 22, 1913.
1,195,741.
Patented Aug. 22, 1916.
9 SHEETS—SHEET 2.
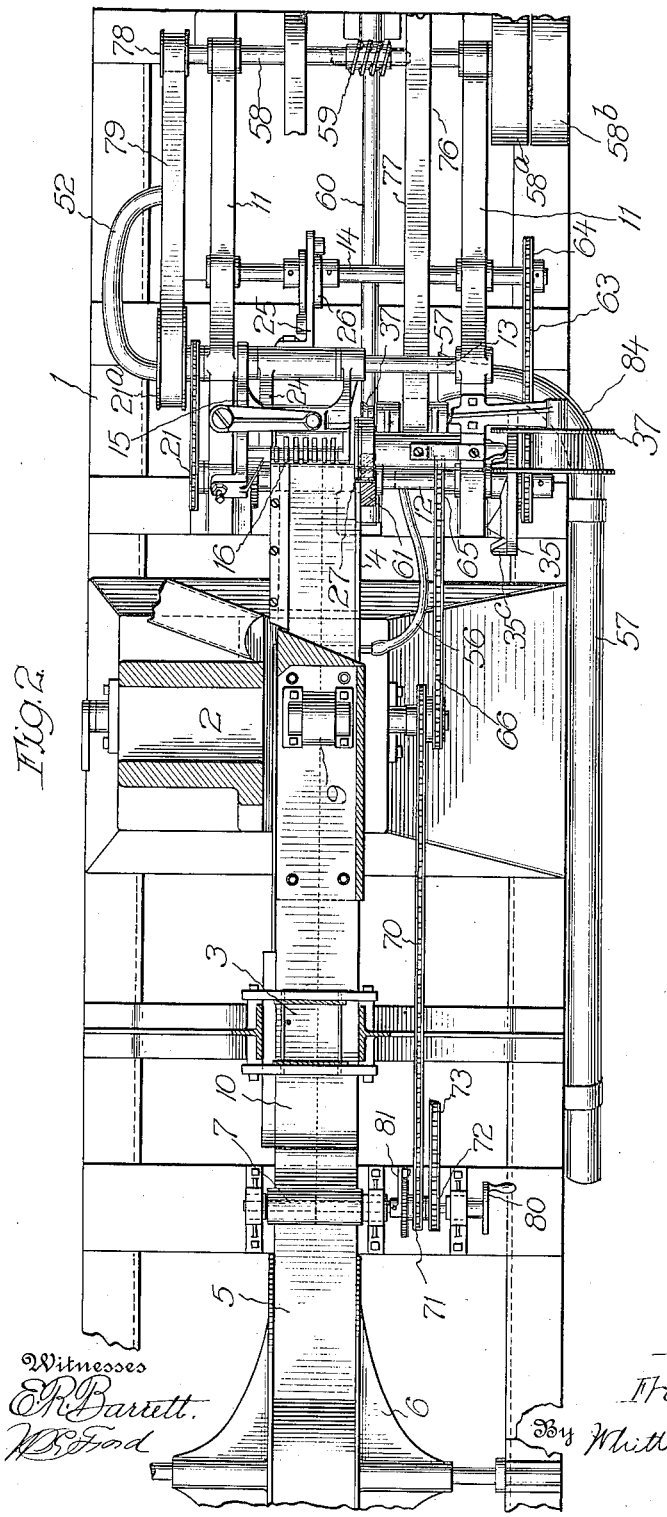

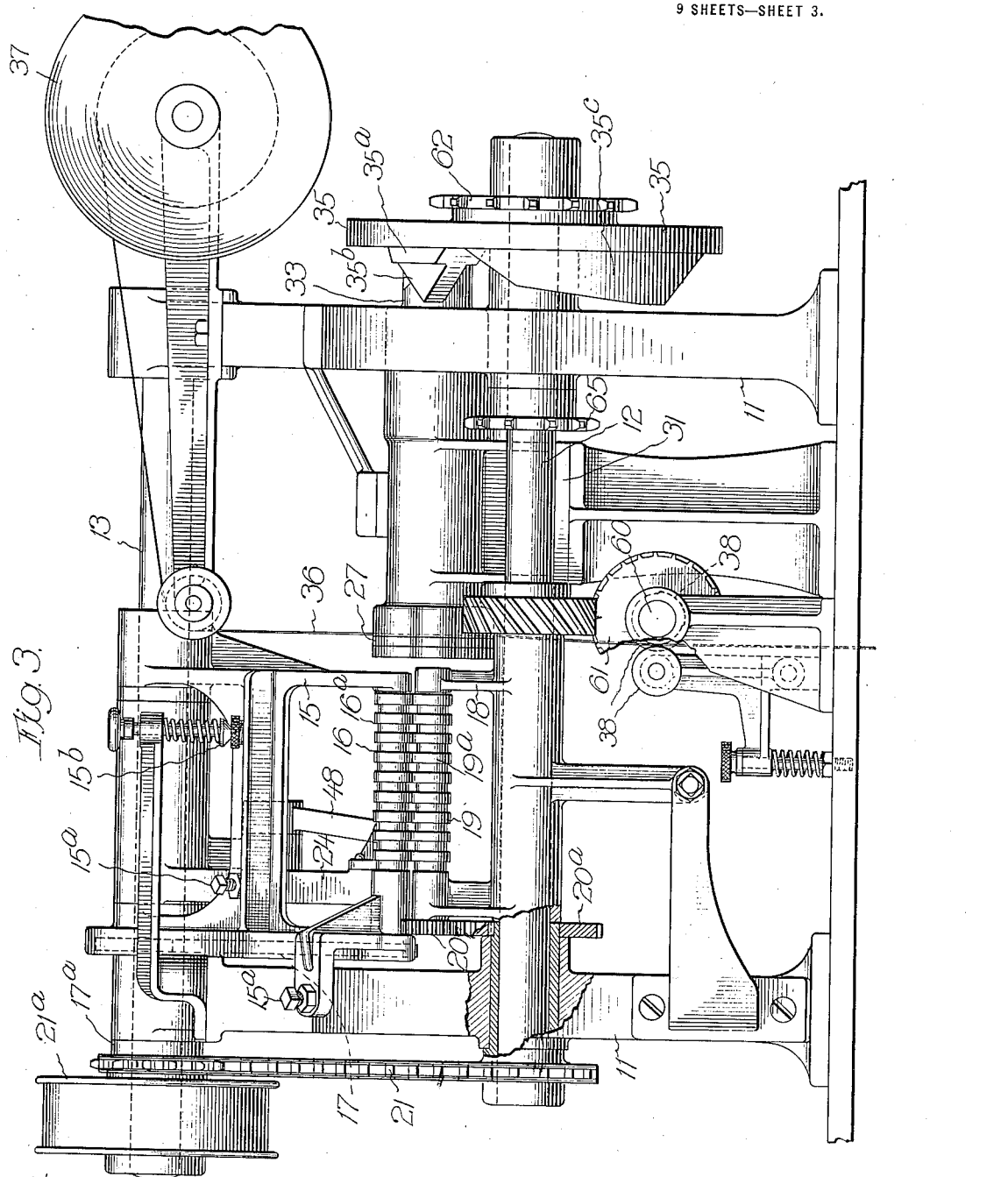

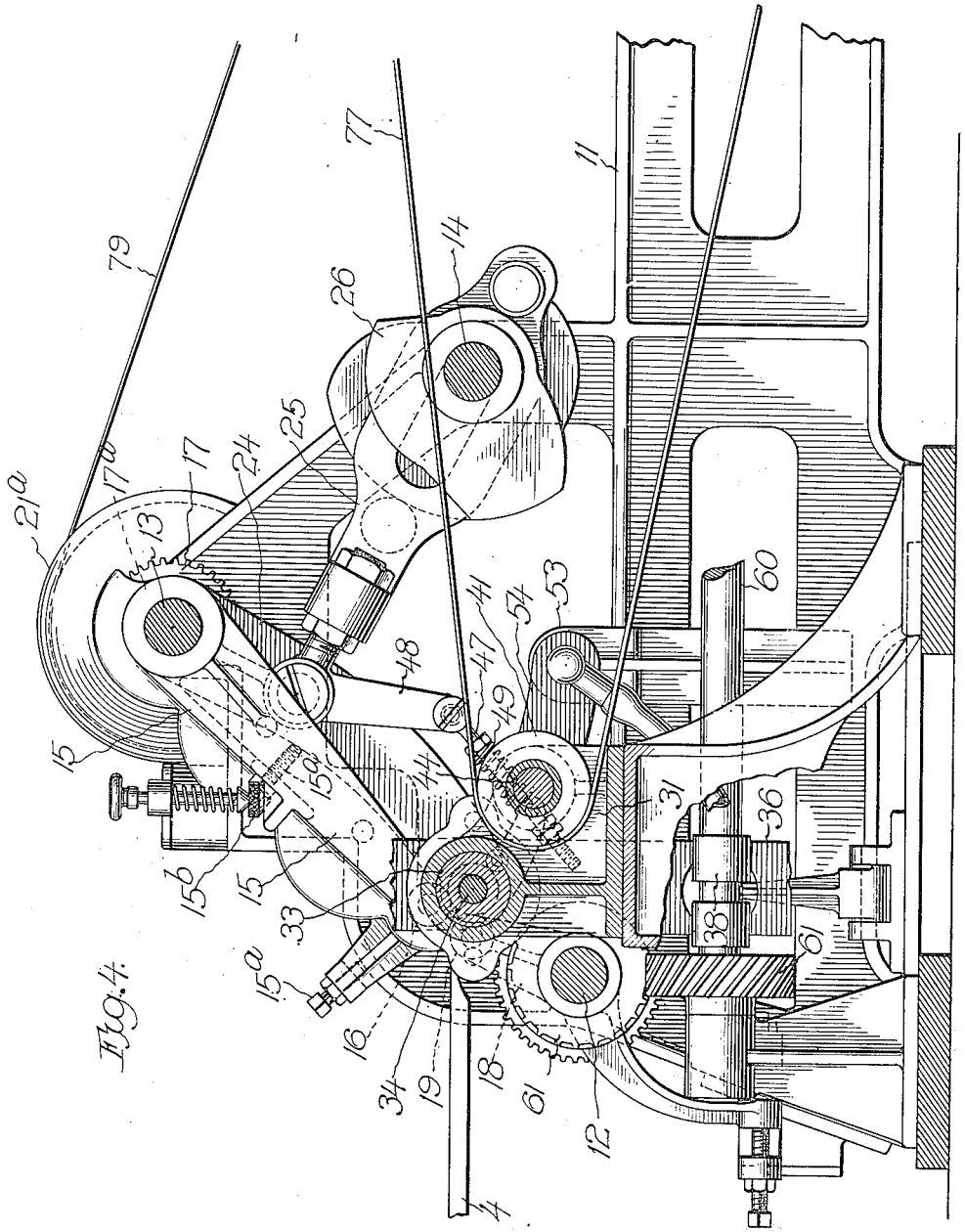

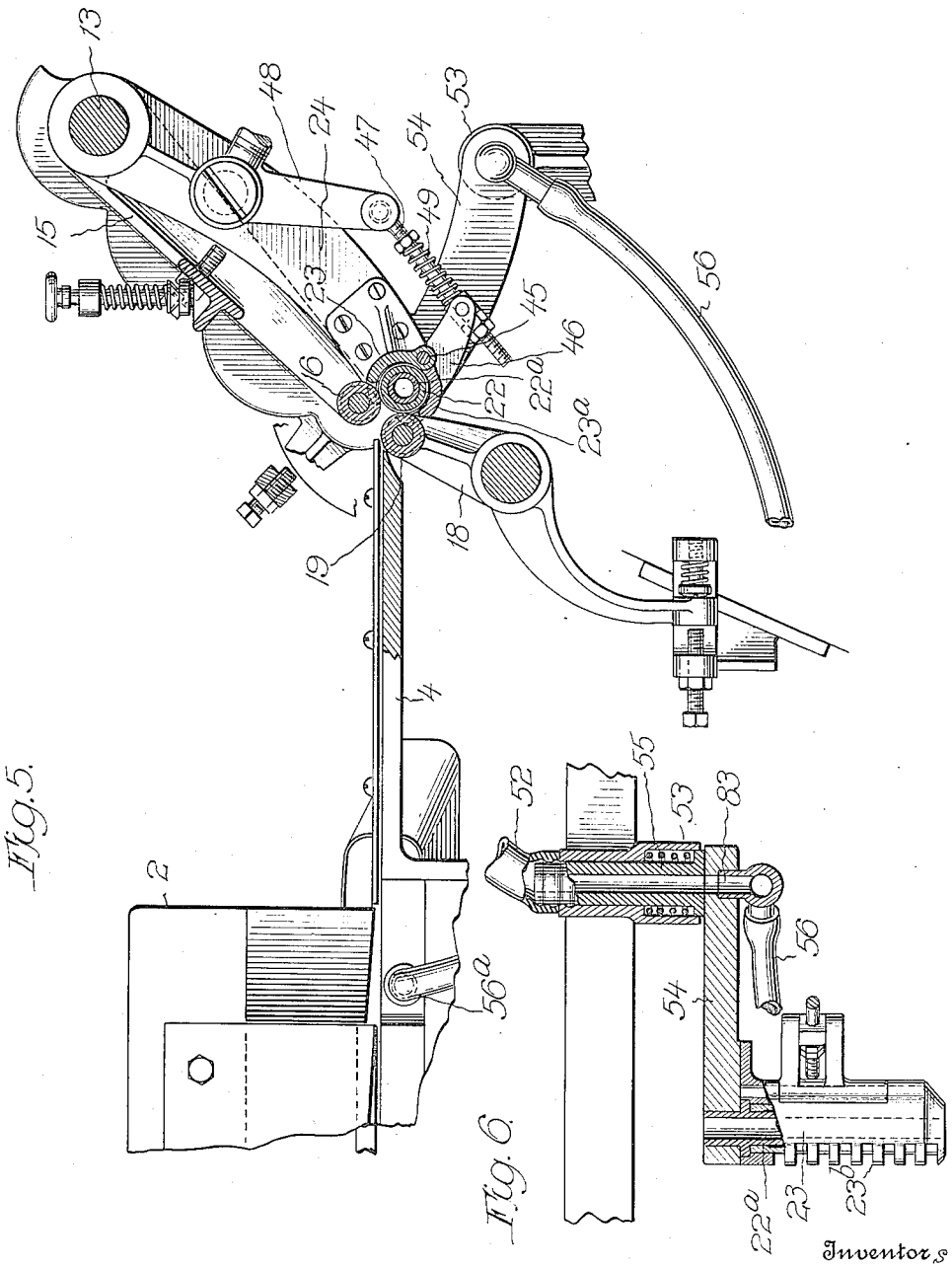

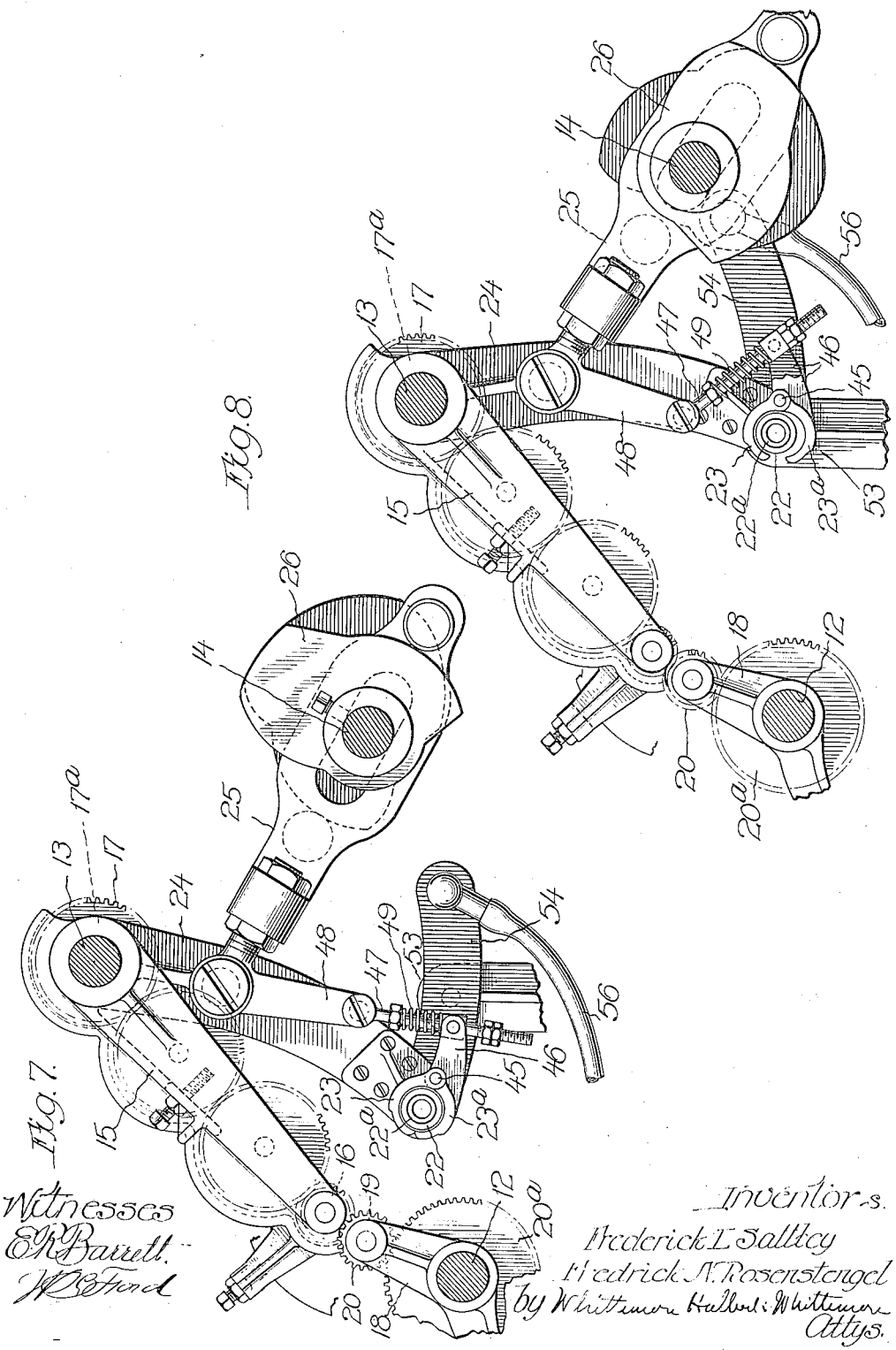

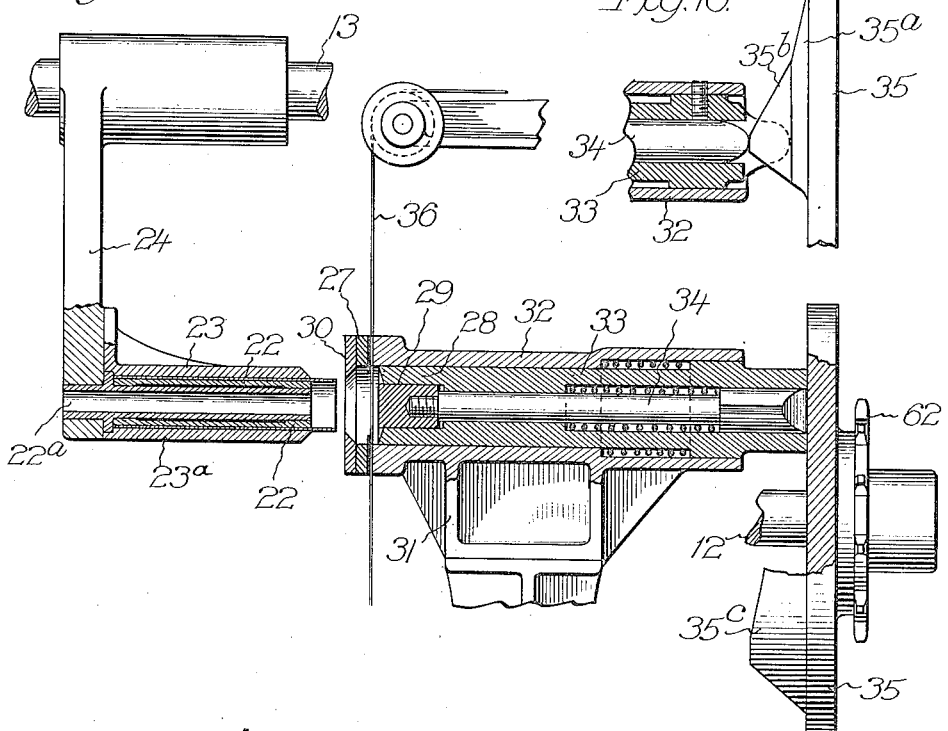

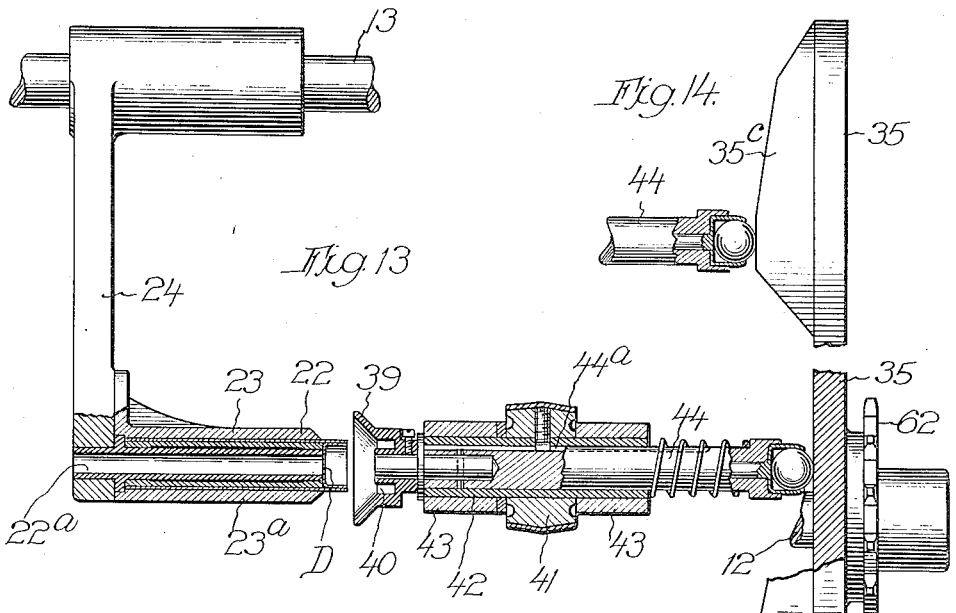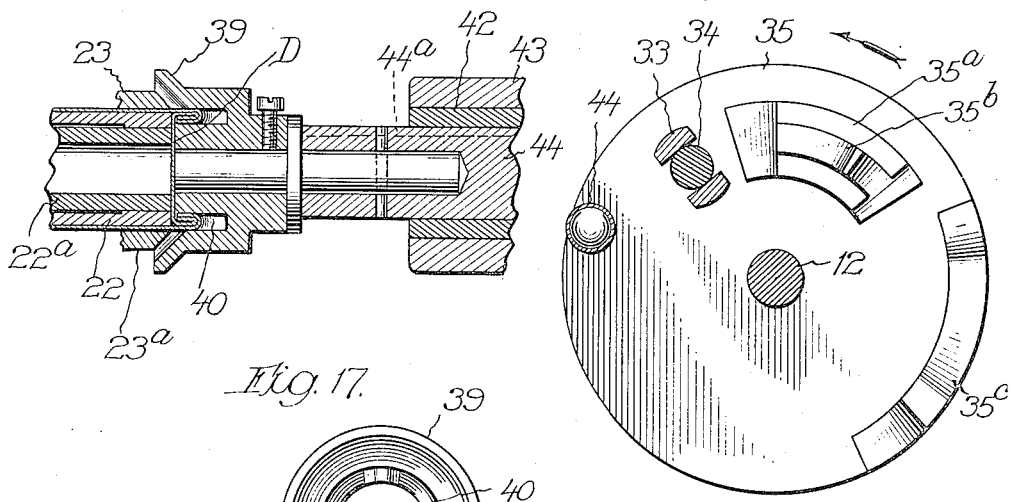

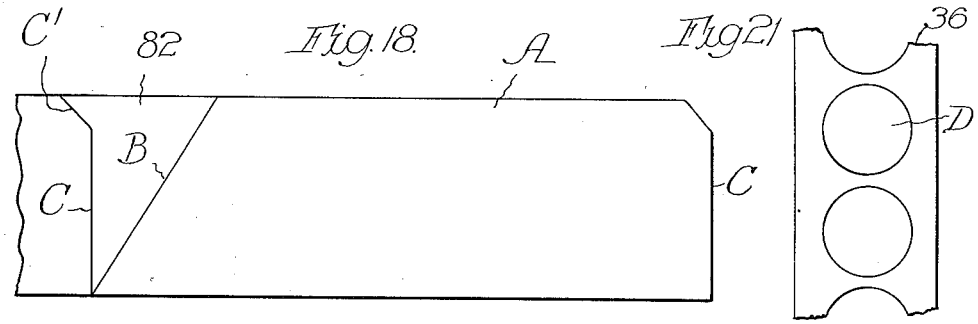
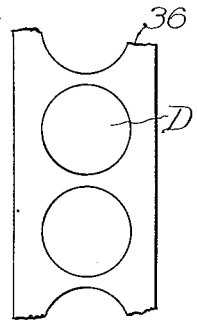
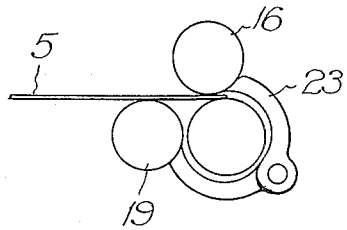
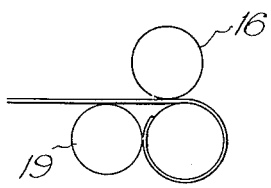
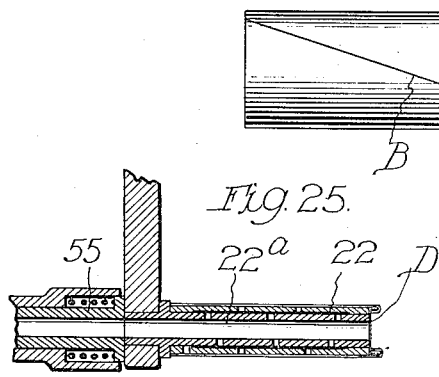

UNITED STATES PATENT OFFICE.

FREDERICK L. SATTLEY AND FREDRICK N. ROSENSTENGEL, OF DETROIT, MICHIGAN, ASSIGNORS TO SATTLEY COIN HANDLING MACHINE COMPANY, OF DETROIT, MICHIGAN, A CORPORATION OF MICHIGAN.

MACHINE FOR FORMING PAPER PACKAGES OR CARTONS.

1,195,741.   Specification of Letters Patent.   Patented Aug. 22, 1916.

Application filed December 22, 1913. Serial No. 808,110.

*To all whom it may concern:*

Be it known that we, FREDERICK L. SATTLEY and FREDRICK N. ROSENSTENGEL, citizens of the United States of America, residing at Detroit, in the county of Wayne and State of Michigan, have invented certain new and useful Improvements in Machines for Forming Paper Packages or Cartons, of which the following is a specification, reference being had therein to the accompanying drawings.

The invention relates to machines for forming paper packages or cartons of that type in which a paper blank is coiled to form a cylindrical body, and a circular flanged head is secured at the end of the body by crimping. In the present state of the art cartons of this character have been manufactured by a hand process, and have the advantage of being formed without the use of glue or other adhesive material. The hand process is, however, necessarily slow and the cost of manufacture is proportionately high.

It is the object of the present invention to obtain a construction of machine in which the operations are entirely automatic from the introduction of the paper stock to the delivery of the completed carton.

To this end the invention comprises various features of construction as hereinafter set forth.

In the drawings: Figure 1 is a side elevation partly in section of the machine; Fig. 2 is a sectional plan view thereof; Fig. 3 is an end elevation of the coiling and heading mechanism; Fig. 4 is an enlarged elevation partly in section of a portion of Fig. 1; Fig. 5 is a longitudinal section through the table for the paper blank and the coiling mechanism in operative relation thereto; Fig. 6 is a sectional plan view of the coiling mechanism; Figs. 7 and 8 are views similar to Fig. 5 showing the mechanism in different positions of adjustment; Fig. 9 is an axial section through the head-forming dies and coiling mandrel in registration therewith; Fig. 10 shows the actuating cams for the head-forming die; Figs. 11 and 12 are views similar to Fig. 9 showing different stages in the operation; Fig. 13 is an axial section through the crimper and the coiling mandrel in alinement therewith; Fig. 14 shows the operating cam for the crimping mechanism; Fig. 15 is a view similar to Fig. 13 at the completion of the crimping operation; Fig. 16 is an elevation of the cams; Fig. 17 is an end elevation of the crimper; Fig. 18 is a plan view of the body blank; Fig. 19 is a diagram showing one position of the coiling mechanism; Fig. 20 is a similar view showing another position; Fig. 21 is an elevation of the strip from which the head blanks are formed; Fig. 22 is a section through the carton after the insertion of the head and before crimping; Fig. 23 is a similar view after crimping; Fig. 24 is a side elevation of the coiled body blank; and Fig. 25 is a section through the coiling mandrel showing the same in position for ejection of the carton.

In the process of forming the carton which is automatically performed by our machine, a paper blank A is cut from a continuously-fed strip to form parallel sides, an oblique rear end B and a square forward end C. This blank is then coiled upon a mandrel and a circular paper head D, separately formed with a crimped cylindrical flange E, is inserted in the open end of the coil. The parallel edges of the flange of the head and of the coil are then folded over by a crimping operation to form a lock-seam F, and on account of the oblique angle B of the end of the coil this securing of the head will also hold the coil from unrolling.

To carry out this process, our machine includes in its organization, first, paper feeding mechanism for advancing paper strips from which the bodies and ends of the carton are respectively formed; second, blanking dies for severing the blanks from said strips; third, coiling mechanism for the body blanks; fourth, head-forming and inserting mechanism coöperating with the coiling mechanism; fifth, crimping mechanism for seaming the head and body sections together so as to prevent disengagement of the former and unrolling of the latter; and sixth, means for disengaging and delivering the completed carton. There is also preferably associated with the mechanism a printing press for suitably stamping the blank to label the carton, and further auxiliary mechanism for coöperating with the main groups above specified and facilitating the production of the completed product.

*General construction.*—Upon a suitable frame 1 is mounted a blanking press 2 and a printing press 3, with a work table or guide 4 for a paper strip 5. This strip is fed from a roll 6, preferably by continuously revolving feed-rolls 7 to the guide 4, and is intermittently advanced over said guide by an interrupted feed-roll 8 below the strip and a coöperating presser-roll 9 above the same. The arrangement is such that the feed-rolls 7 and 8 feed equal lengths of the strip during the cycle, but at different rates of speed, the roll 7 operating continuously and the roll 8 intermittently, while a slack loop 10 intermediate said rolls compensates for differential feed.

The blanking press 2 may be of any suitable construction, adapted when tripped to form the blank. As, however, the opposite ends of the blank are at different angles to the sides, there is a gore section of the strip cut out in each operation, which is removed by means hereinafter described. The feed-roll 8 advances the strip to the point of engagement with the coiling mechanism, and just in advance of the operation of the latter the press 2 severs the rear end of the blank from the stock, the forward end having been fashioned by a preceding operation. The severed blank is then engaged by the coiling mechanism of the following construction.

*Coiling mechanism.*—11 are side frames in rear of the blanking press 2, provided with journal bearings for a plurality of cross shafts 12, 13 and 14. The cross shaft 13 has sleeved thereon a hinged inclined frame 15, having journaled in its bifurcated lower end a feed-roll 16 driven by a gear train 17 mounted on said frame, from a sleeve 17ª on the shaft 13. The shaft 12 also has a hinged frame 18 mounted thereon, carrying at its upper end a feed-roll 19 which is located below and slightly in advance of the roll 16. This roll 19 is driven by a gear train 20 from a sleeve 20ª on the shaft 12, and the sleeves 17ª and 20ª are connected by a sprocket and chain drive 21 rotated by a pulley 21ª. The whole construction is such that the rolls 16 and 19 lie respectively slightly above and slightly below the plane of feed of the blank A and opposite the forward end thereof. Also the drive trains are so proportioned that these rolls operate at differential speed, the roll 19 having the higher velocity.

The coiling of the blank is accomplished by the pressing of a coiling mandrel 22, journaled on a pin 22ª, into contact with the rolls 16 and 19 and with the end of the blank therebetween. The mandrel is inclosed within an outer cylindrical shell 23, with a clearance space sufficient to receive the coiled paper. Both mandrel and shell are carried by a swinging arm 24, which is preferably hinged upon the shaft 13, and is operated by a link 25 from a cam 26 upon the shaft 14. The cam 26 is so fashioned and timed that as soon as the paper blank A is severed from the strip the arm 24 will be moved into a position where the mandrel and rolls 16 and 19 are in contact (Fig. 19), thereby causing the former to be revolved upon the pin 22ª, carrying the blank around within the shell 23 and continuing the rotation until completely coiled. As the roll 19 revolves at a slightly greater speed than the roll 16 it will exert a drawing tension upon the portion of the blank first upon the mandrel which will result in winding a tight coil.

*Heading mechanism.*—Arranged in axial alinement with the mandrel when in position for coiling is the head blanking, forming and engaging mechanism. This comprises a circular die member 27 in alinement with a punch member 28, while within the latter is a forming head 29 coöperating with a forming die 30 for crimping the marginal portion of the circular blank and forming a cylindrical flange thereof. All of these parts are mounted upon a bracket 31 upon the frame, having a bearing 32 for the concentrically arranged shanks 33 and 34 of the blanking and forming punches 28 and 29. These shanks are actuated by cams 35ª and 35ᵇ on a wheel 35 upon the shaft 12, driven in properly timed relation with the other parts of the mechanism. The head blanks D are cut by the dies from a strip 36 fed from a roll 37 between the die 27 and punch 28, the feeding being intermittently effected by interrupted feed-rolls 38 engaging the portion of the strip beyond the punch. The mechanism just described is such that during the coiling of the body blank upon the mandrel, a head blank D is punched, formed and inserted in the revolving end of the coil by the reciprocation of the plungers 33 and 34, so that at the completion of the coiling the head is in full engagement with the body, as shown in Figs. 9 to 12.

*Crimping mechanism.*—At the completion of the operation just described the arm 24 is swung by the cam 26 so as to transfer the mandrel and coiling cage from their position of alinement with the heading mechanism to a position in alinement with the crimping mechanism, as shown in Figs. 7, 13 and 15. The crimper comprises a rotating head 39 having an annular groove 40 therein for receiving the end of the coil and adjacent flange on the head when in registration therewith. The head 39 is rapidly revolved by a pulley 41 which is mounted upon a sleeve 42 journaled in bearings 43, while a shank 44 for the head 39 has a longitudinally-adjustable feathered engagement 44ª with this sleeve. The movement of the shank is effected by a cam 35ᶜ on the same wheel 35 which carries the cams for the head-blanking mechanism, and the timing is such that during the interval in which the mandrel and cage are in registration with the head 39, said head will be pressed inward, turning the double flange formed by the end of the coil and flange E of the head, and forming the lock-seam F.

Before performing the operation just described, it is necessary to hold the coiled blank from movement on the mandrel. This is automatically effected by forming the shell 23 of two segmental sections hinged to each other at 45, the movable section 23ª having an arm 46 connected by a toggle link 47 with an arm 48 secured to the link 25. The swinging of the arm 24 will cause a relative movement of these connections, due to the fact that said arm 24 is moving angularly, while the link 25 and arm 48 secured thereto move in a substantially rectilinear direction. Consequently there is a change in the angular relation between the arm 24 and arm 48, which causes the latter to straighten the toggle link 47, actuating the arm 46 and causing the cage section 23ª to pinch the coiled blank upon the mandrel and hold it in fixed relation thereto, as shown in Fig. 7. This clamping is preferably effected through a yielding connection formed by a spring 49 upon the link 47, which avoids any stress upon the paper that might be injurious. Thus during the operation of the crimping mechanism the coiled blank is rigidly clamped by the cage and mandrel, so as to afford the necessary resistance to the pressure of the crimping head.

After the crimping operation the carton is complete, but it is necessary to disengage it from the mandrel and coiling cage, and the capacity of the machine is dependent upon the rapidity of performance of this operation. We have therefore provided means for removing the carton practically instantaneously, which is accomplished by a puff of air. This not only disengages the carton but delivers it to a receptacle which is free from the mechanism of the machine and in a position convenient for removal. Essentially the pneumatic disengaging device comprises an air conduit leading to the mandrel and controlled by a valve which at the proper instant is opened to admit a puff of compressed air between the mandrel and carton, shooting the latter outward into a delivery conduit, which conveys it to the receiving container.

The best operation is obtained when the air pressure for each succeeding operation is the same and this is assured by forming the air compressing device as an organized part of the machine. We therefore preferably employ an air-compressing pump 50, which is mounted upon the frame 1 and is driven constantly during the operation of the machine, by a suitable drive connection 51. From this pump an air conduit 52 leads to a point 53 on the frame which is in alinement with the mandrel in its final position of adjustment, as shown in Fig. 25. Movement to this final position is effected by the cam 26 which at the completion of the crimping operation swings the arm 24 further in the same direction, carrying the mandrel and cage in alinement with the point 53. During this further swinging of the arm 24 the toggle link 47 and arm 48 will be moved beyond the center position and will assume an angular position, which releases the clamping pressure of the cage member 23ª upon the carton, permitting the latter to be disengaged by the puff of air. The valve controlling the admission of air is preferably formed by a segment 54 upon the arm 24, which slides over a ported block 55 at the point 53, and to which the air delivery conduit 52 is connected. The segment 54 has two ports therein, one in alinement with the mandrel and the other at the opposite end, which latter port is connected by a flexible conduit 56 with the blanking press 2, in a position to blow away the gore section removed from the strip 5, as indicated at 56ª. Thus a single valve forming an integral part of the mandrel-carrying arm, controls the removal of the scrap from the blanking press and the disengagement and delivery of the completed cartons.

When the mandrel is in its final position (Figs. 8 and 25), air is admitted from the conduit 52 and ported block 55 into the end of the pin 22ª, which is hollow, and through ports in said pin and mandrel to the periphery of the latter. The compressed air also passes completely through the pin 22ª and impinges against the head D of the carton, thereby forcing it off from the mandrel and delivering it into a chute 57.

*Drive mechanism.*—The drive mechanism for the various operative groups may be of any suitable construction, but as shown, comprises the following: 58 is the drive shaft having tight and loose pulleys 58ª and 58ᵇ thereon. 59 is a worm drive connection from the shaft 58 to a longitudinally-extending shaft 60, which latter is connected by spiral gears 61 with the shaft 12. The shaft 12 drives a sprocket 62 connected by a chain 63 with a sprocket 64 on the shaft 14, upon which latter the cam 26 is mounted. There is also upon the shaft 12 a sprocket 65 connected by a chain 66 with a sprocket 67 on a shaft 68 for the interrupted feed-roll 8. A sprocket 69 on this same shaft is connected by a chain 70 with a sprocket 71 for the feed-rolls, and a sprocket 72 and chain 73 communicate motion from this roll to the cam 74 operating the printing mechanism 3. The feed-roll 38 for the head-forming strip 36 is mounted on the shaft 60; the pump 50 is driven by the belt connection 51 from a pulley 75 on the shaft 58; a pulley 76 on said shaft and the belt 77 drive the pulley 41; and a pulley 78 on the shaft 58 drives a belt 79 extending to the pulley 21$^a$. The press 2 is operated by connections and a trip mechanism (not shown).

*Complete operation.*—Motion being imparted to the shaft 58, the various groups of mechanism are driven through the intermediate connections as just described, to produce a sequence of operations as follows: The paper strip is continuously fed by the rolls 72 at a rate of speed, which delivers in each cycle a length approximately equal to that delivered by the intermittent feed-roll 8. During the interval of inaction of the latter, the continued feeding of the paper will form the slack-loop 10, while during the operation of the interrupted feed-roll 8 this loop will be shortened to compensate for the accelerated speed. It is practically impossible to adjust these two feed mechanisms so as to exactly balance, and we have therefore provided a hand feed, operated by the hand-wheel 80 and connected power feed, by the ratchet wheel connection 81. Thus if the loop 10 becomes longer or shorter than desired the operator by turning the crank 80 may adjust the length of this loop. When the paper strip is delivered upon the table 4 it is intermittently fed by the interrupted feed-roll 8, each operation delivering a length equal to one blank. During the interval of inaction the press 2 is tripped, and in reciprocating trims the blank, cutting out the gore section 82 and simultaneously forming the beveled edge B of one blank and the square edge C of the adjacent blank, a corner C' being cut therefrom. As soon as the gore is released by the upward movement of the trimming die, a puff of air is admitted at the point 56$^a$ to blow away the gore and prevent it from fouling the subsequent feeding of the strip. The air for this puff is generated by the pump 50, which is in continuous operation, and the delivery of the puff is timed by the movement of the swinging arm 24 and valve slide 54 carried thereby. Thus, just as said arm 24 has carried the mandrel 22 into operative relation to the rolls 16 and 19, a port 83 in the slide 54 registers with the apertured block 55, admitting air from the conduit 52 to the conduit 56, which latter leads to the point 56$^a$. After the initial trimming which forms the squared end C upon the strip 5, the second intermittent feeding of this strip will deliver the squared end between the rolls 16 and 19 and in position for engagement with the mandrel 22. The rolls 16 and 19 may be accurately positioned by adjusting the hinged frames 15 and 18, by suitable means such as the adjusting screws 15$^a$, while a slight resiliency or yielding of the frame is permitted by a spring-stop 15$^b$. Thus when the mandrel 22 is pressed against the roll 16 with the forward edge of the strip 5 therebetween, the pressure will be just sufficient for imparting motion to the strip and mandrel. Before this contacting pressure of the mandrel upon the roll 16 is made, an operation of the press 2 will have severed the blank on the table 4 from the continuous strip 5, so that when the mandrel is driven, the blank is free to be coiled thereon.

In the coiling of the blank, the cage 23 will guide the strip around the mandrel, and by providing the two sections 23 and 23$^a$ of this cage with finger extensions 23$^b$, the cage may completely surround the mandrel without interference with the rolls 16 and 19, which are grooved at 16$^a$ and 19$^a$ to receive said fingers. Thus the strip will coil around the mandrel until its forward edge passes beneath the roll 19, when, due to the slightly higher velocity of this roll, the strip is drawn taut, so as to form a close coil. Any desired number of convolutions may be superposed during this winding operation, and the rotary motion is continued to prevent uncoiling until the coil is clamped by movement of the cage section 23$^a$. Simultaneously with the operation of the coiling mechanism the head-punching and forming mechanism is operating, and as this is in axial alinement with the mandrel, the formed head will be pressed by the forming-head 29 and shank 34 into the revolving end of the coil and against the end of the mandrel therein. The forming-head 29 will be withdrawn while the mandrel is still in position of alinement therewith, thereby freeing the coil and head for adjustment with said mandrel in its second position.

The second position, shown in Fig. 7, is one in which the mandrel is axially alined with the crimper 39, while the toggle links 47 and 48 are straightened so as to produce a clamping tension, by the spring 49, arm 46 and section 23$^a$, upon the coil. This not only arrests rotary movement of the coil and mandrel but also holds the coil from unwinding or loosening its coils while the crimper is operating thereupon. The crimper is reciprocated, as above described, and turns the adjacent flanges of the head and coil to form the seam F, as shown in Fig. 23, which secures the head and locks the convolutions of the coil from unwinding. The movement of the mandrel from the first to the second position is effected by the cam 26 and the same cam produces the further movement to the third position, shown in Fig. 8. In passing to this latter position the toggle links 47 and 48 are thrown beyond the center into angular position, which draws upon the arm 46 and unclamps the section 23ᵃ of the cage. The movement of the mandrel to this third position also registers the hollow pin 22ᵃ, on which the mandrel is journaled, with the apertured block 55 which admits air from the conduit 52. This air, having been stored in said conduit 52 during the period in which the valve slide 54 is closed and by reason of the continuous operation of the pump, will have risen in pressure so that the instant air is admitted to the hollow mandrel it will expel the coiled body, relieving it from friction upon the mandrel, and by the pressure on the head D shooting the article out of engagement. The velocity imparted by this action is sufficient not only to disengage the carton but will carry it through a comparatively long delivery conduit 84 to a receptacle clear of the machine.

The pneumatic disengagement and delivery of the completed article is an important feature of the construction, for it greatly increases the output of the machine. In fact, it is unnecessary for the mandrel to dwell any appreciable interval of time in the third position, as the disengagement and delivery is practically instantaneous. The pneumatic removal of the gore is also important in that it prevents any danger of clogging the machine.

What we claim as our invention is:

1. The combination with a revoluble mandrel of a guide thereabout, a pair of differentially revolving members, means for positioning a blank with its forward end between said revolving members, and means for pressing said revoluble mandrel against said differentially revolving members and the interposed blank, to produce the coiling of the latter about said mandrel and within said guide and to tighten the coil by the differential speed of said revolving members.

2. The combination with a revoluble mandrel and a guide about the same, of a pair of differentially driven rolls, means for positioning a blank with its forward portion between said rolls and its forward edge adjacent to the slower roll, and means for pressing said revoluble mandrel against said rolls and the interposed end of the blank to coil the latter about the mandrel within said guide and to tighten the coil by the drawing action of the faster roll.

3. The combination with a revoluble mandrel of a pair of differentially driven rolls, means for positioning a blank with its forward portion between said rolls and its forward end adjacent to the slower roll, a cage surrounding said mandrel with a peripheral clearance for the latter and having cut-away portions, means for moving said mandrel to engage said differentially-driven rolls with the cut-away portions of said cage and to press said mandrel against said rolls and the interposed blank, to produce a coiling of the latter and tightening of the coil by the faster driven roll, and means for clamping said cage against the coil to prevent loosening of the same.

4. The combination with a revoluble mandrel of a pair of differentially-driven rolls, means for positioning a blank between said rolls with its forward edge adjacent to the slower roll, means for pressing said mandrel against said rolls and interposed end of the blank to coil the latter and to tighten the coil by the faster driven roll, and means for clamping the coil when wound to prevent loosening of the same.

5. The combination with a revoluble mandrel of a pair of differentially-driven rolls yieldably positioned, means for positioning a blank between said rolls with its forward end adjacent to the slower roll, and means for pressing said mandrel against said rolls and the interposed end of said blank to coil and tighten the latter.

6. The combination with means for coiling a blank of means operating simultaneously with the coiling for inserting a head in the coil.

7. The combination with means for coiling a blank of means operating simultaneously with the coiling for forming and inserting a head in the coil.

8. The combination with means for coiling a blank of means operating simultaneously with the coiling for blanking, forming and inserting a head in the coil.

9. The combination with a revoluble mandrel of means for coiling a blank upon said mandrel, and means in registration with said mandrel during the coiling operation for forming and inserting a head in the coil.

10. The combination with a revoluble mandrel of means for coiling a blank thereon, means in registration with said mandrel for forming and inserting a head in the coil during the continued revolving of the mandrel and forming of the coil, and means for clamping the coil upon said mandrel at the completion of the coiling and heading operations.

11. The combination with a revoluble mandrel of a revoluble roll, means for positioning a blank with its forward edge adjacent to said roll, means for moving said mandrel to press the same against said roll and the interposed end of the blank to revolve the mandrel and coil the blank thereabout, means in registration with said mandrel while in coöperation with said roll for forming and inserting a head in the coil, means for clamping the coil at the completion of the coiling and heading operations, and means registering with said mandrel while said coil is clamped thereon for clamping or seaming together the head and coil.

12. The combination with a revoluble mandrel of a sectional cage or shield surrounding the same, a driven roll, means for positioning a blank with its forward end between said driven roll and mandrel, means for pressing said mandrel and driven roll against each other and the interposed blank to coil the blank within said cage, and means for relatively moving the sections of the cage to clamp the completed coil upon the mandrel.

13. The combination with a revoluble mandrel of a pair of differentially-driven rolls, means for positioning a blank between said rolls with its forward edge adjacent to the slower roll, means for moving the mandrel against said rolls and an interposed end of the blank, to produce the coiling of the latter and the tightening of the coil by the faster roll, adjusting means for independently, accurately positioning said rolls in relation to said mandrel, and resilient means for yieldably holding said rolls in their position of relative adjustment.

14. The combination with a blank-supporting table of a pair of differentially-driven rolls, rockable frames in which said rolls are journaled, a revoluble mandrel, means for moving said revoluble mandrel in operative relation to said driven rolls, and adjusting means for said rockable frames for accurately positioning the same and the rolls carried thereby in relation to said revoluble mandrel.

15. The combination with a revoluble mandrel of a movable frame carrying said mandrel, means coöperating with said mandrel at one point in its path for coiling a blank thereon and inserting a head in the coil, means located at another point for disengaging the headed coil from the mandrel, means at an intermediate point for crimping or locking the head to the coil, and means operated by the movement of said frame for automatically clamping said coil upon said mandrel during the crimping operation and for releasing the same.

16. The combination with a revoluble mandrel of a sectional cage surrounding said mandrel, a rockable arm carrying said mandrel and cage, a link for rocking said arm to different positions of adjustment, and a toggle lever connection between said link and a section of said cage for automatically clamping the cage in one position of adjustment of said arm and releasing the cage at another position of adjustment.

17. The combination with a revoluble mandrel of means for transporting said mandrel into different positions, means coöperating with the mandrel in one of said positions for coiling a blank upon said mandrel and inserting a head into the coil, means located at another position for seaming the head within the coil, and pneumatic means at a third position for removing the headed coil.

18. The combination with a revoluble mandrel of means for simultaneously coiling a blank upon said mandrel and inserting a head in the end of the coil, and means for pneumatically ejecting the headed coil from the mandrel.

19. The combination with a revoluble hollow mandrel of means for simultaneously coiling a blank thereon and engaging the head in the coil, and means registering with said hollow mandrel after the completion of the coiling and heading operations for admitting compressed air therein to eject the headed coil from the mandrel.

20. The combination with a hollow, revoluble mandrel having a free end, of means for moving said mandrel into different positions, means for coiling a blank upon the mandrel, means registering with the free end of said mandrel in one of its positions for heading the coil simultaneously with the coiling operation, and means for admitting compressed air in said hollow mandrel when out of registration with said heading means to eject the headed coil from the mandrel.

21. The combination with a revoluble, hollow mandrel open at opposite ends, of means for transporting the mandrel for coiling a blank upon said mandrel, means temporarily in registration with one end of the mandrel during the coiling operation for heading said coiled blank, and means registering with the opposite end of said mandrel when out of registration with said heading means for admitting compressed air to eject the headed blank.

22. The combination with a revoluble mandrel of means for coiling a blank upon said mandrel, means temporarily registering with the end of said mandrel for heading the coil, and means operating when said mandrel is out of registration with the heading means for admitting compressed air between the periphery of the mandrel and the coil and against the head thereof, to relieve friction and eject the headed coil.

23. The combination with a revoluble, hollow mandrel open at opposite ends, of a traveling arm carrying said mandrel, means for coiling a blank upon said mandrel and for heading the same, a laterally-extending plate upon said arm, and a ported member connected with a source of compressed air, in slidable contact with said plate and registering with said hollow mandrel in one position of said arm to admit the air for ejecting the headed coil.

24. The combination with a blanking press of a revoluble mandrel, means for feeding a blank from said press to said mandrel, means for coiling the blank upon said mandrel, means for heading the coil, means for supplying compressed air, and means for alternatively directing the compressed air to said blanking press and mandrel to remove the scrap from the former and to eject the headed coil from the latter.

25. The combination with a revoluble mandrel of means for coiling a blank thereon, head blanking and forming dies in registration with said mandrel during the coiling operation, means for intermittently feeding a blank strip transversely of said head blanking and forming dies, and alternatively-operating means for actuating said dies to sever, form and insert the head into said coil while in registration therewith.

26. The combination of a rockable arm, a revoluble mandrel journaled thereon, means for coiling a blank upon said mandrel cooperating therewith in one position of said rockable arm, means in registration with said mandrel while in this position for blanking and forming a head and for inserting the same into the coil, means registering with said mandrel in another position of said arm for crimping the head and coil, and pneumatic means registering with said mandrel in a third position of said arm for admitting air to eject the headed coil from the mandrel.

27. The combination with a revoluble mandrel movable to different positions, of coaxial head blanking and forming dies in alinement with the axis of said mandrel in one position of the latter, means for coiling the blank upon the mandrel in this position, means for intermittently feeding a head-blanking strip across said head-blanking and forming dies, and means alternatively operating with said feeding means for successively reciprocating said blanking die and head-forming die and for pressing the head by the latter into the coil, said head die being withdrawn from said coil in advance of the movement of said mandrel out of registration with said dies.

28. The combination with a revoluble mandrel, of a traveling surface, means for pressing said mandrel against said traveling surface and in frictional contact with an interposed blank, means surrounding said mandrel for guiding said blank thereabout to produce a coil and for resiliently clamping the coil when wound to prevent loosening of the same.

29. The combination with a revoluble mandrel and a coil heading means, of a revolving member, means for feeding a blank with its forward edge in proximity to said revolving member, and means for reciprocating said mandrel and contacting said mandrel and revolving member with said blank to produce the coiling of the latter about the mandrel and simultaneously alining said mandrel with said coil heading means.

30. The combination with a revoluble mandrel, of a cage surrounding said mandrel with a limited clearance, a revolving member, means for feeding the end of a blank between said revolving member and mandrel, and means for reciprocating said mandrel to press said mandrel against said revolving member and the interposed end of the blank to coil the latter about the mandrel and within the cage, said mandrel being pressed subsequently to the feeding of the end of the blank between the revolving member and the mandrel.

31. The combination with a revoluble mandrel, of a cage surrounding said mandrel with a limited clearance and an opening at one point, means for positioning a blank, a revolving member adjacent to the forward end of the positioned blank, a rockable member carrying said mandrel, and means for rocking said member to press the revoluble mandrel against said revolving member and the interposed end of the blank and to register the opening in said cage with the end of the blank to permit the feeding in and coiling of the same.

32. The combination with a revoluble mandrel, of a movable member adjacent said mandrel, a swinging member carrying said mandrel and movable member, a member for moving said swinging member to different positions of adjustment, and connections between said member for moving the swinging member and said member adjacent the mandrel for moving said member adjacent the mandrel against said mandrel in one position of adjustment of said swinging member.

33. The combination with a revoluble mandrel, of a clamping member adjacent said mandrel, a rockable member carrying said mandrel and clamping member, a link for rocking said member to different positions of adjustment, and a connection between said link and clamping member for automatically clamping the latter in one position of adjustment of said rockable member.

34. The combination with a revoluble mandrel, of a clamping member adjacent said mandrel, a rockable member carrying said mandrel and clamping member, a link for rocking said member to different positions of adjustment, a connection between said link and clamping member for automatically clamping the latter in one position of adjustment of said rockable member, and a cam for actuating said link.

35. The combination with a revoluble mandrel, of means for simultaneously coiling a blank thereon and heading the coiled blank, means for crimping or seaming the head and coil, and pneumatic means for removing the headed coil from the mandrel.

36. The combination with a revoluble mandrel, of means for coiling a blank on said mandrel, and means for heading said coiled blank and crimping or seaming the head within the coil, including a member common to said heading and crimping or seaming means for directly actuating the same.

37. The combination with a revoluble mandrel, of means for coiling a blank on said mandrel, plungers for forming and inserting a head in the end of the coil, a separate rotating plunger for crimping or seaming the head within the coil, and a cammed revolving member common to all of the plungers for directly actuating the plungers.

38. The combination with a revoluble mandrel, of a rockable arm carrying said mandrel, means for rocking said arm to different positions of adjustment, means for coiling a blank on said mandrel in one position of adjustment, means for heading the coiled blank in said position, and means for crimping or seaming the head within the coil in another position of adjustment, said coiling means and crimping means including a member common to both.

39. The combination with a revoluble mandrel, of means for coiling a cylindrical blank upon said mandrel, means for heading the coiled blank, and means for directing compressed air against the periphery and head of said coiled and headed blank to eject the same from said mandrel.

40. The combination with a revoluble mandrel, of differentially rotating rolls for coiling a blank upon the mandrel.

41. The combination with a revoluble mandrel, of a pair of rotating rolls, means for positioning a blank between said rolls, means for moving the mandrel against said rolls and an interposed end of the blank to produce the coiling of the latter, adjusting means for independently accurately positioning said rolls in relation to said mandrel, and resilient means for yieldably holding said rolls in their position of relative adjustment.

42. The combination with a revoluble mandrel, of a continuously traveling surface, means for periodically reciprocating said mandrel to press said mandrel and traveling surface against each other and in frictional contact with an interposed blank and to aline said mandrel with crimping means.

43. The combination with a revoluble mandrel, of a continuously traveling surface, means for periodically reciprocating said mandrel to respectively press said mandrel and traveling surface against each other and in frictional contact with an interposed blank, to aline said mandrel with crimping means, and to aline said mandrel with means for ejecting the coiled blank therefrom.

44. The combination with a revolving member, of a revoluble mandrel, means for reciprocating said mandrel and for pressing the same against said revolving member and in frictional contact with an interposed blank, means for guiding the blank around said mandrel, and means operated by the movement of the reciprocating means for automatically clamping said guiding means upon said mandrel and for releasing the same.

45. The combination with a revoluble mandrel and a clamping member adjacent thereto, of a movable member carrying said mandrel and clamping member, and means operated by the movement of said member for automatically clamping said clamping member upon said mandrel and for releasing the same.

In testimony whereof we affix our signatures in presence of two witnesses.

FREDERICK L. SATTLEY.
FREDRICK N. ROSENSTENGEL.

Witnesses:
JAMES P. BARRY,
HENRI E. BOWMAN.